United States Patent [19]

Richard

[11] Patent Number: 5,620,077
[45] Date of Patent: Apr. 15, 1997

[54] FAIL-SAFE BRAKE ACTUATION SYSTEM

[75] Inventor: Arthur L. Richard, Sudbury, Canada

[73] Assignee: Electric Vehicle Controllers Ltd., Ontario, Canada

[21] Appl. No.: 454,627

[22] Filed: May 31, 1995

[30] Foreign Application Priority Data

Jun. 1, 1994 [GB] United Kingdom ............... 9410962

[51] Int. Cl.$^6$ .................................................. B60K 41/24
[52] U.S. Cl. .......................... 192/120; 188/173; 192/9; 477/9; 477/172; 477/190
[58] Field of Search ............................ 192/12 D, 13 R, 192/9; 477/9, 172, 190, 182; 188/158, 171, 173

[56] References Cited

U.S. PATENT DOCUMENTS

| 3,741,357 | 6/1973 | Krysiuk et al. | 192/12 D |
|---|---|---|---|
| 4,022,307 | 5/1977 | Berrié et al. | 192/12 D |
| 4,223,775 | 9/1980 | Lloyd | 192/12 D X |
| 4,538,717 | 9/1985 | Blohm et al. | 192/12 D X |
| 4,805,740 | 2/1989 | Wilke et al. | 188/173 |
| 4,844,233 | 7/1989 | Kempf et al. | 192/9 |
| 5,180,038 | 1/1993 | Arnold et al. | 188/771 |

FOREIGN PATENT DOCUMENTS 909176 10/1962 United Kingdom.

*Primary Examiner*—Andrea L. Pitts
*Attorney, Agent, or Firm*—Anthony Asquith & Co.

[57] ABSTRACT

The actuator uses an electric motor to drive a recirculating ball screw thread connection, to hold a brake-actuation spring at bay. After the spring has been compressed to the brakes-off position, the electric motor is de-energized. Then, the screw-thread connection is prevented from rotating and backing off, by virtue of the fact that the electric motor is connected to the screw thread via a high-reduction worm gear-box, which will not reverse-drive. An electric clutch is included between the screw-thread connection and the gearbox, the clutch being held, electrically, in the locked or drive condition while the brake is required to be held off. The brake is applied by releasing or de-energizing the clutch to the non-drive or free condition.

5 Claims, 4 Drawing Sheets

FAIL-SAFE BRAKE ACTUATION SYSTEM

This invention relates to a Fail-Safe Brake Actuation System, and especially relates to actuation systems for brakes in which the brake is applied by electric motor, and in which the signal that indicates when the brakes are to be applied or released, is also electrical.

BACKGROUND OF THE INVENTION

Among the prior art items that might be considered relevant to the invention may be included:

SUMMARY OF THE INVENTION

The apparatus as described herein is based on the operation of a reversible screw-thread connection; that is to say, a screw thread connection in which, because of the geometry of the screw-thread, an axial force applied to the connection generates a torque acting to cause relative rotation of the screw-threaded elements at the connection.

In the apparatus as described herein, the brake actuation force is applied as an axial force to the reversible screw-thread connection, generating the torque. But the brake remains unactuated because of an operable clutch, which, when operated, prevents rotation at the reversible screw-thread connection.

The clutch is of the electrically-operated or energized type. It is a feature of the apparatus that a failure to supply an electrical signal to the clutch causes the brake to be fully applied. During normal operation, when the clutch is operated and engaged, the brake is held off, or applied partially or fully, as dictated by operational requirements, by means of a motorised brake actuator. The clutch is located between the screw-thread connection and the motorised actuator, in such a manner that when the clutch is not operated, and is disengaged, the motorised actuator is ineffective to actuate or de-actuate the brake.

By way of further explanation of the invention, exemplary embodiments of the invention will now be described with reference to the accompanying drawings, in which:

DETAILED DESCRIPTION OF PREFERRED EMBODIMENTS

The apparatuses shown in the accompanying drawings and described below are examples which embody the invention. It should be noted that the scope of the invention is defined by the accompanying claims, and not necessarily by specific features of exemplary embodiments.

Figure 1:
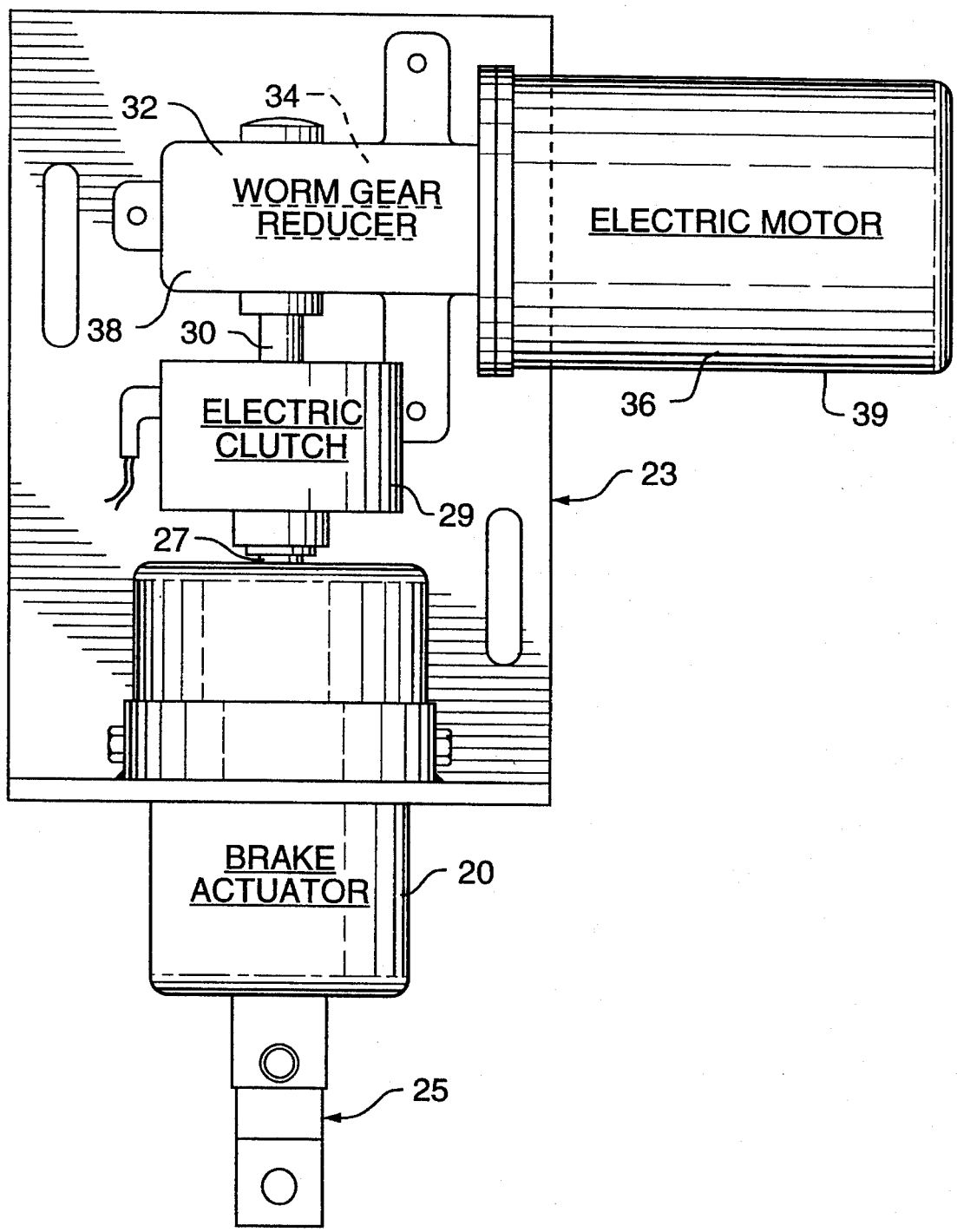
FIG. 1 is a front elevation of a brake actuation apparatus which embodies the invention.
Figure 2:
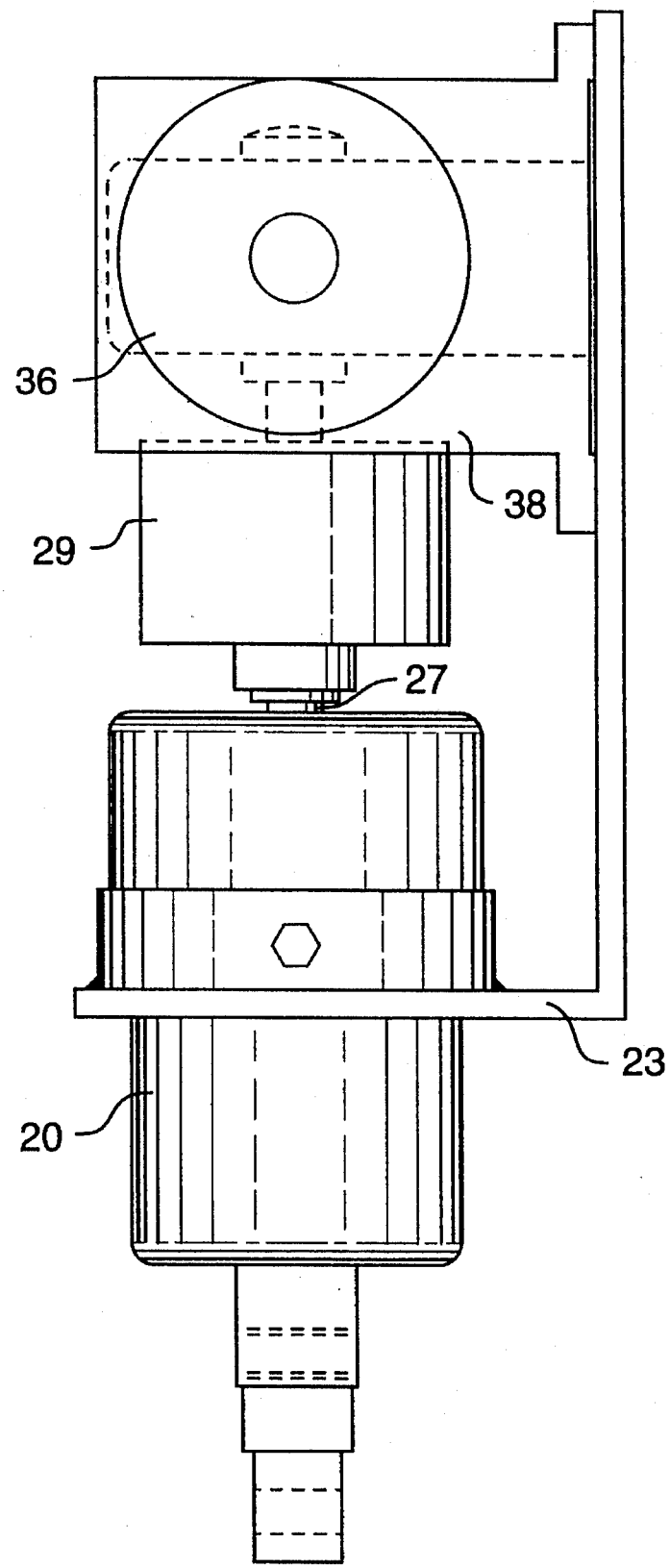
FIG. 2 is a side elevation of the apparatus of FIG. 1.
Figure 3:
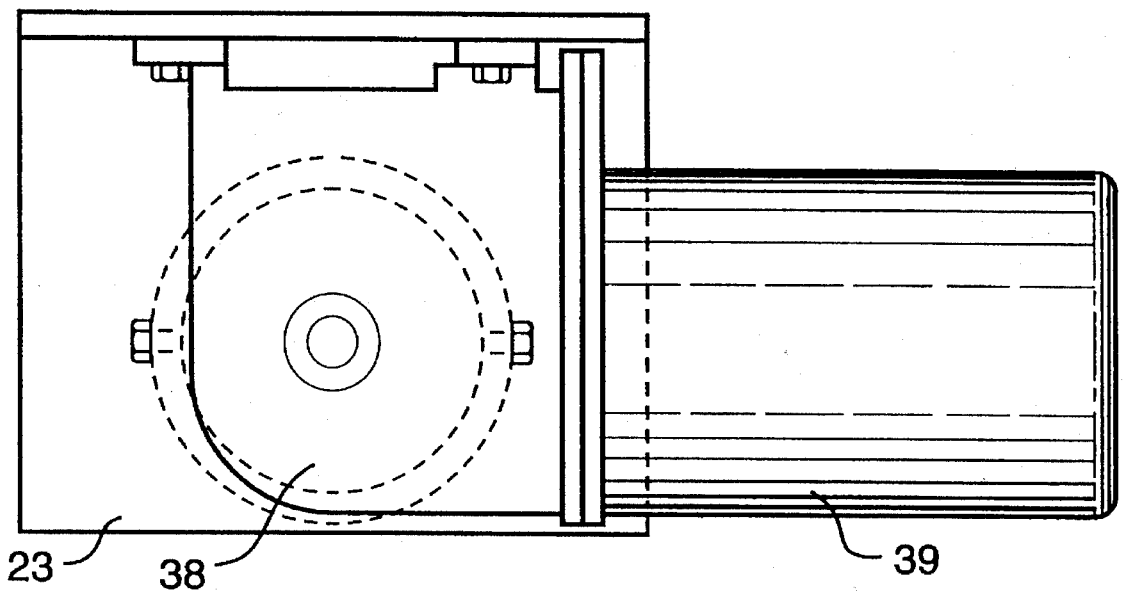
FIG. 3 is a plan view of the apparatus of FIG. 1.
Figure 4:
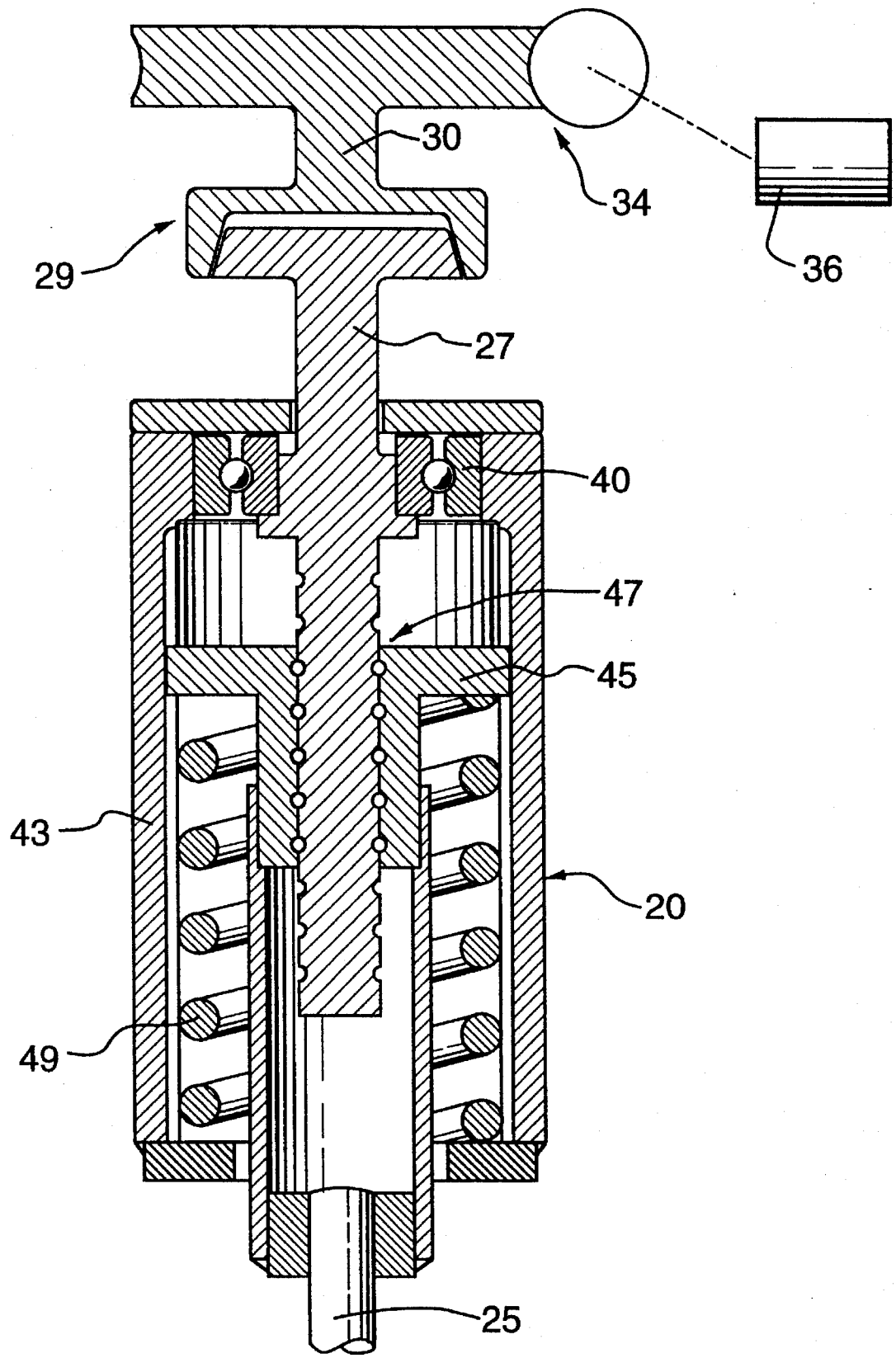
FIG. 4 is a cross-section of a component of the apparatus of FIG. 1.

As shown in FIG. 1, the apparatus includes a spring-operated brake actuator 20, which is bolted to a mounting bracket 23.

Extending downwards from the actuator 20 is a pull-rod 25. The rod 25 is coupled to the brake itself (not shown): when the rod 25 is pulled upwards, the brake is applied, and when the rod 25 is lowered the brake is released.

Extending upwards from the actuator 20 is a drive shaft 27. As will be described below, the drive shaft 27 rotates during brake actuation and release.

The drive shaft 27 is coupled to an electrically operated clutch 29. The housing of the clutch 29 is secured to the bracket 23 against rotation.

The upper end of the clutch 29 is coupled to the output shaft 30 of a motor/gearbox combination 32. The combination 32 includes a worm-gear reducer 34, comprising a worm-wheel and worm-shaft. The worm-shaft is a direct extension of the armature of the electric motor 36. The housing 38 of the gearbox is bolted directly to the casing 39 of the motor. The combination 32 is of a conventional, everyday, proprietary type.

The worm gear reducer 34 is of the conventional type that is so arranged as to be non-reversible. That is to say: when the worm-gear is driven, the worm-wheel rotates; but when the worm-wheel is driven, the worm-gear does not rotate.

"Non-reversible" means that a torque applied to the input-shaft of the gear-reducer (in this case the armature of the electric motor) is effective to cause a corresponding rotation of the worm-wheel (and hence of the output-shaft 30). But a torque applied to the output-shaft 30 (worm-wheel) cannot effect a corresponding rotation of the input-shaft (armature). The output-shaft 30 remains locked against rotation unless the input-shaft is driven to rotate.

Another way of stating that the gear-reducer 34 is non-reversible is to state that the mechanical efficiency of the reducer is less than fifty percent.

Non-reversible gear reducers are of course perfectly well-known machine elements. The present invention lies in the new arrangement of the well-known elements, as described.

The electric motor 36 is controllable to drive either clockwise or anti-clockwise. One sense drives the brake ON, the other drives the brake OFF.

The electric clutch 29 is a conventional proprietary item. By the action of the clutch, the output-shaft 30 from the gear reducer 34 is selectably drive-coupled, or not coupled, to the drive shaft 27 of the brake actuator 20. The clutch 29 is energized and de-energized electrically. Again, the electric clutch 29 is of the well-known conventional type.

The clutch 29 is of the normally-open type. That is to say, the clutch is of the type that remains dis-engaged, i.e not-driving, when no electrical signal is supplied to it. The clutch goes to the drive-engaged state upon being electrically energized.

The drive-shaft 27 of the brake-actuator 20 is guided for rotation in a bearing 40 in the frame 43 of the actuator. The bearing is a thrust bearing, i.e. the bearing, constrains the drive-shaft 27 against longitudinal motion.

The bearing 40 is of the type that can support axial/thrust forces, and the bearing should be selected on the basis of being able to support the brake actuation forces in the pull-rod 25 while the drive-shaft 27 is rotating.

The pull-rod 25 is fixed to a nut 45. The nut 45 is constrained against rotation in the actuator frame 43 by virtue of a suitable peg-and-slot arrangement, or a non-circularity in the frame, etc. The nut is guided for movement longitudinally within the frame.

The drive-shaft 27 and the nut 45 are coupled together by means of a screw-thread connection 47 of the re-circulating-ball type.

The screw-thread connection 47 is of the reversible type. That is to say, relative rotation occurs when a torque is applied to the screw thread; but relative rotation also occurs when a longitudinal axial or thrust force is applied to the connection. Under an axially-applied load, the connection 47 can only be prevented from rotating by the use of a means (such as the clutch 29) for independently locking the drive-shaft against rotation.

Heavy springs 49 exert a force on the nut 45, urging the nut upwards, and thereby applying tension to the pull-rod 25.

In use, the apparatus is connected to the brake of a vehicle or a piece of machinery. First, the clutch 29 is energized, and engaged. So long as the clutch remains energized, the drive-shaft 27 and the output-shaft 30 remain locked together. During normal operation, the motor 36 is then used to power-drive the appropriate amount of tension into the pull-rod 25. The vehicle operator controls the motor to rotate clockwise or anti-clockwise in accordance with braking requirements. The brake itself may be of the simple ON/OFF type, or may be of the progressive type.

In fact, it is the springs 49 which apply the brake: the motor power is used to relieve a portion of the force of the springs away from the pull-rod 25. The brake is OFF when the motor holds the springs compressed; the brake is fully ON when the springs are applying their full load to the pull-rod.

The brake actuator apparatus as described may be used in situations where a fail-safe operational characteristic is required, i.e. where the vehicle can only be driven normally—the brake being applied and released under the control of the vehicle operator—provided the clutch 29 is energized.

If the clutch 29 should become de-energized, the clutch then goes to the "non-drive" condition. Then, the drive-shaft 27 and the output-shaft 30 are no longer in mutual drive-torque-transmitting connection. Now, the force of the springs 49 takes over, an applies and axial force to the reversible screw-thread connection 47. As a result, the torque generated by the screw-thread connection, acting on the drive-shaft 27, is no longer resisted, and the drive-shaft 27 rotates. The pull-rod 25 is thereby subjected to the maximum tension that is available from the energy stored in the springs 49.

This fail-safe character of the bake actuator is useful for the type of vehicle that requires a "dead-man's-handle" facility; in which, if the driver takes his hand off the handle, the vehicle is brought to a stop. The vehicle can only be operated normally provided, and so long as, the driver maintains the handle in an operational condition.

In the present case, the "dead-man's handle" may take the form of a button 29a of a transmitter 29b if the driver takes his finger off the button, the signal to the clutch 29 ceases the clutch operating means if the clutch 29 is de-energized, and the clutch is released. The screw-thread connection 47 collapses, and the brake is applied to the full force of the springs. Alternately, the reason for the requirement for the fail-safe operation may be that the operator has moved too far away from the (remote-operated) vehicle. In this case, the signal to energize the clutch may be derived by radio or the like, and the clutch becomes de-energized when the signal becomes too weak due to distance.

The apparatus as described derives its efficiency from the use of the reversible-screw-thread-connection, in which an axial force generates, and gives rise to, a corresponding rotary torque. The torque is resisted by the clutch. The drive-shaft cannot rotate relative to the output-shaft while the clutch is energized. Upon release of the clutch, the screw-thread connection immediately collapses.

The gear-reducer on the other hand is non-reversible. Therefore, during normal operation of the brake, the motor does not have to be operated continuously. The brake can be actuated by a single operation of the motor. After that, the motor is switched off; the brake will remain at its set condition until the motor is driven in reverse, thereby releasing the brake.

The purpose of this invention is to provide an electrically operated fail-safe brake for use on radio controlled and other automated equipment where no operator is present to activate the manually operated braking system.

The system is fail-safe because it is spring applied and requires electric power to release the brakes, and conversely the lack of power to apply them. In the event of any power interruption, whether it be from loss of the radio link between the transmitter and receiver, or from mechanical damage to the electrical wiring within the vehicle, the brakes automatically apply bringing the vehicle to a full stop. The system may also serve as a parking brake when no operator is in attendance.

The brakes are released by activating an electric worm gear reducer which is coupled to the spring loaded ball screw actuator by means of an electrically energized clutch. After several revolutions of the gear reducer with the clutch engaged, the 500 pound spring is compressed and the brakes released. At this point the gear reducer is de-energized, but being of a high gear ratio, it will not back drive and remains in its de-energized position with brakes released. At the same time the gear reducer is energized, the electric clutch is also energized, coupling the gear reducer to the ball screw. The clutch remains energized keeping the spring depressed and the brakes released during the entire time the vehicle is in operation. Since current draw by the clutch is only 0.3 amperes, it has insignificant effect on battery life.

All that is necessary to apply the brakes is to remove power to the clutch thus allowing the spring to back drive the ball screw nut. This in turn allows the ball screw and clutch plate to rotate, and the spring tension to apply the brakes.

All "fail-safe" braking systems, whether air, hydraulic, or electric, rely on a spring to apply them. Consequently, a spring is defined as "fail-safe". However, in the rare event a spring should break, this system utilizes two springs so that at least partial brake application is assured in the event one spring should fail.

I claim:

1. Apparatus for fail-safe operation of a brake, wherein:

the apparatus includes a brake-applying spring, which is capable of exerting braking force;

the apparatus includes a pair of members arranged in a rotor-and-stator, screw-thread relationship, the arrangement being such that rotation of the rotor-member is effective to change the level of mechanical energy stored in the spring;

screw-thread relationship is of the type which is non-self-sustaining, but in which an axial force applied between the members generates a positive and substantial torque tending to turn the rotor-member;

the apparatus includes a drive-shaft for transmitting rotational mechanical energy to the rotor-member;

the apparatus includes a gear-drive-mechanism, having an input-shaft and an output-shaft;

the gear-drive-mechanism is of the non-reversible type, in that a torque applied to the input-shaft is effective to cause a corresponding rotation of the output-shaft, but a torque applied to the output-shaft cannot effect a corresponding rotation of the input-shaft, whereby the output-shaft remains locked against rotation unless the input-shaft is driven to rotate;

the apparatus includes an operable electric motor, connected to the input-shaft;

the apparatus includes a clutch, which is connected in a drive-transmitting relationship between the drive-shaft and the output-shaft, and which is operable between a drive-transmitting or locked condition and a non-drive-transmitting or free condition;

the apparatus includes an electrically operable clutch-operating means, which is responsive to the receipt of an electrical signal, for operating the clutch between the two conditions;

the arrangement of the apparatus is such that when the clutch is operated to the drive-transmitting condition, the clutch holds the drive-shaft rotationally-locked to the output-shaft.

2. Apparatus of claim 1, wherein the clutch-operating means, in response to a signal in the form of the presence of an electrical voltage, is effective to operate the clutch to the drive-transmitting or locked condition, and, in response to a signal in the form of an absence of an electrical voltage, is effective to operate the clutch to the non-drive-transmitting or free condition.

3. Apparatus of claim 1, wherein the screw-thread connection is a recirculating-ball-and-groove screw-thread-connection, having substantially zero resistance to rotation.

4. Apparatus of claim 2 wherein the clutch operating means includes an operable transmitter, and the transmitter is effective, when operated, to transmit said electrical signal.

5. Apparatus of claim 4, wherein the transmitter is of such a structure that the signal transmitted by the transmitter becomes ineffective to operate the clutch when the transmitter is more than a pre-determined distance from the clutch.

* * * * *